US 8,024,982 B2

(12) United States Patent
Pettit et al.

(10) Patent No.: US 8,024,982 B2
(45) Date of Patent: Sep. 27, 2011

(54) DUCT-MOUNTABLE SENSING UNIT

(75) Inventors: Casey Pettit, Portland, OR (US);
Mathew Vernon, Portland, OR (US);
Rich Soennichsen, Portland, OR (US)

(73) Assignee: Veris Industries, LLC, Portland, OR (US)

( * ) Notice: Subject to any disclaimer, the term of this patent is extended or adjusted under 35 U.S.C. 154(b) by 306 days.

(21) Appl. No.: 12/218,681

(22) Filed: Jul. 16, 2008

(65) Prior Publication Data
US 2009/0064803 A1 Mar. 12, 2009

Related U.S. Application Data

(60) Provisional application No. 60/993,214, filed on Sep. 10, 2007.

(51) Int. Cl.
*G01F 1/34* (2006.01)
*G01D 21/02* (2006.01)
(52) U.S. Cl. ............... 73/861.42; 73/866.5; 73/170.14
(58) Field of Classification Search ............. 73/866.5, 73/861.42, 170.14
See application file for complete search history.

(56) References Cited

U.S. PATENT DOCUMENTS

| | | | |
|---|---|---|---|
| 4,368,639 A * | 1/1983 | Owens | 73/301 |
| 5,844,138 A | 12/1998 | Cota | |
| 6,122,972 A | 9/2000 | Crider | |
| 6,170,345 B1 * | 1/2001 | Kerner | 73/866.5 |
| 6,241,950 B1 * | 6/2001 | Veelenturf et al. | 422/103 |
| 6,852,216 B2 * | 2/2005 | Moscaritolo et al. | 210/85 |
| 6,941,193 B2 * | 9/2005 | Frecska et al. | 700/276 |
| 7,421,911 B2 * | 9/2008 | Desrochers et al. | 73/863.03 |
| 7,661,327 B2 * | 2/2010 | Bourgein et al. | 73/865.9 |
| 2004/0182132 A1 * | 9/2004 | Head | 73/23.2 |
| 2005/0066711 A1 * | 3/2005 | Discenzo | 73/64.56 |
| 2006/0107774 A1 * | 5/2006 | Meyberg | 73/866.5 |
| 2007/0137318 A1 * | 6/2007 | Desrochers et al. | 73/863.81 |
| 2008/0178694 A1 * | 7/2008 | Barford et al. | 73/866.5 |

OTHER PUBLICATIONS

Veris Industries Product Information Sheet, "H Series Probe Type Humidity Sensors 1% and 2% NIST, or Standard 2%, 3%, or 5%," 2006 Veris Industries, 2 pages.
Veris Industries Product Information Sheet, "HW Series Wall Mount Humidity Sensors 1%, 2%, 3%, or 5% Accuracy—Nist certificates available for 1% & 2% Models," 2006 Veris Industries, 2 pages.
Veris Industries Product Information Sheet, "PX Series Digital Pressure Transducer Dry Media," 2007 Veris Industries, 1 page.
Veris Industries Product Information Sheet,"PW2 Series 2-Wire 4-20mA Differential Pressure Transducer—Wet Media," 2006 Veris Industries, 2 pages.
Veris Industries, "Installation Instructions for PW2 Series 2-Wire, 4-20mA Differential Pressure Transducer Wet Media," 2006 Veris Industries, 2 pages.

* cited by examiner

*Primary Examiner* — Lisa Caputo
*Assistant Examiner* — Punam Roy
(74) *Attorney, Agent, or Firm* — Chernoff, Villhauer, McClung & Stenzel

(57) ABSTRACT

A duct-mountable sensing unit includes a plurality of sensors for detecting respective parameters, including pressure, of a fluid in a duct. The sensing unit enables fluid communication between the sensors and the fluid in the duct through a single insertion point in the duct.

18 Claims, 5 Drawing Sheets

DUCT-MOUNTABLE SENSING UNIT

CROSS-REFERENCE TO RELATED APPLICATIONS

This application claims the benefit of U.S. Provisional App. No. 60/993,214, filed on Sep. 10, 2007.

BACKGROUND OF THE INVENTION

The present invention relates to a sensing unit mountable on a wall of a duct for detecting a plurality of parameters of a fluid in the duct.

Temperature and humidity are primary factors in the comfort and quality of an indoor environment. While temperature is important to comfort, the humidity is a substantial factor in determining whether a specific temperature is comfortable. Temperature is commonly regulated as a function of the relative humidity in a space and humidifiers, to control the relative humidity, are often a part of the heating, cooling and ventilation systems of office buildings and industrial plants.

Relative humidity may be sensed by a sensor that comprises a polymer that is typically mounted on a porous ceramic plate and has a resistivity that changes as a function of the humidity. This type sensor is usually not sufficiently accurate for use with a ventilation system and is subject to deterioration in harsh environments.

A second type of humidity sensor employs a capacitor in which the dielectric comprises environmental air. Since the dielectric constant of air is one and the dielectric constant of water is approximately 80, changes in the relative humidity changes the dielectric constant of the air separating the capacitor plates, and, hence, the capacitance of the sensor. Variation in capacitance can be used in a number of ways in circuits to provide an electrical output that is indicative of the relative humidity.

The accuracy of the variable capacitance sensor depends upon the accuracy of the sensor's nominal capacitance which can be altered by the way in which the capacitor is shipped, handled or otherwise introduced to the environment. Cota, U.S. Pat. No. 5,844,138, discloses a humidity sensing device that includes a humidity sensitive capacitor comprising part of an oscillator circuit. The frequency of the oscillator is a function of the capacitance of the humidity sensitive capacitor which, in turn, is a function of the relative humidity. The true capacitance of the humidity sensitive capacitor is measured against a known standard and stored in a memory in the humidity sensing device. A microprocessor uses the true capacitance data stored in the memory to correct the relative humidity measurements made with the device to account changes in capacitance resulting from aging or from shipping and handling of the device. A voltage divider network in the humidity sensing device provides temperature compensation for the relative humidity measurements. Cota also discloses an apparatus for supporting the humidity sensor in a stream of fluid flowing in a duct. An enclosure with an attached sleeve is bolted to the exterior of the duct with the sleeve projecting through a hole in the duct's wall. The humidity sensitive capacitor is secured in the end of a tube which passes through the sleeve. A swage nut compresses the sleeve to secure the tube and the humidity sensitive element in the fluid flowing in the duct.

Temperature is commonly measured with a thermistor or a resistance temperature detector (RTD) which exploit the predictable change in electrical resistance of certain materials when they are exposed to changing temperatures. Thermistors and RTDs can be very compact enabling a temperature sensor to be included with the humidity sensor in a mounting similar to that disclosed by Cota.

Carbon dioxide ($CO_2$) is a product of human respiration and, while high levels of carbon dioxide are toxic to humans, the concentration of carbon dioxide in an indoor environment is commonly used as a surrogate to indicate the presence of other indoor pollutants that may cause occupants to grow drowsy, have headaches, or function at a lower activity level. Since human respiration is a primary source of carbon dioxide in indoor environments, building codes typically specify the amount of outdoor air to be added to an interior space by the ventilation system on the basis of the occupancy of the space. In the past, ventilation systems commonly maintained a ventilation rate, at all times, that was sufficient for full occupancy of the space. However, heating, cooling, humidifying and moving this volume of air at times when the occupancy is low is wasteful of energy and expensive. Demand controlled ventilation seeks to vary the amount of outside air added to a space, under conditions of variable and intermittent occupancy, to optimize the comfort and well being of occupants and reduce energy consumption. Carbon dioxide concentration is used as an indicator of the occupancy and as a control parameter for demand controlled ventilation.

The presence of carbon dioxide is typically detected with either a chemical sensor or a non-dispersive infrared sensor. Chemical sensors comprise materials that are sensitive to the presence of $CO_2$ and while they typically consume little energy and can be miniaturized, they have a relatively short lifespan and are subject to drift effecting the short and long term accuracy of the sensor. Non-dispersive infrared sensors comprise a source and a detector of infrared light disposed at opposite ends of a light tube and an interference filter to prevent light, with exception of light absorbed by the gas molecules of interest, from reaching the detector. A gas to be tested is introduced to the light tube and the absorption of a characteristic wavelength of light is measured to determine the presence of $CO_2$ in the gas. Non-dispersive infrared sensors can be expensive but are commonly used because no other known method works as reliably to detect $CO_2$.

A $CO_2$ sensor can be mounted on a wall in the space to be monitored in a manner similar to the installation of a thermostat. The location of the sensor should be selected to expose the sensor to air that is indicative of general conditions within the occupied zone. Locations near doors, windows and air vents or close to where people would regularly sit or stand should be avoided because the $CO_2$ may be locally diluted by air from outside or concentrated by the local activity. A large number of wall mounted sensors are typically required because each sensor is only exposed to the local environment and at least one sensor is typically required in each space. Sensors for humidity and temperature may be combined with a wall mounted $CO_2$ sensor to reduce the number of sensor installations.

$CO_2$ sensors may also be installed on the ductwork of an air handling system to detect the concentration of $CO_2$ in the air flowing in the ducts. Duct mounted $CO_2$ sensors are typically arranged to detect $CO_2$ in fluid that is a returning from a space but may also be mounted in the air intake for the ventilation system to measure the $CO_2$ in the intake air. While a ventilation system comprising a plurality of zones typically incorporates a number of sensors, a duct mounted sensor can serve a plurality of zones reducing the required number of sensors. Duct mounting of the $CO_2$ sensor is best applied where the ventilation system operates continuously and where the monitored return airstream serves one or more zones that have similar levels of activity and occupancy at similar times.

In addition to monitoring temperature, humidity and carbon dioxide, sensors may be installed in a duct for detecting other constituents of the fluid flowing in the duct, such as, carbon monoxide (CO), volatile organic compounds (VOC) and smoke.

In addition to monitoring parameters that effect air or fluid quality, ventilation and other fluid circulating systems commonly include sensors, for example pressure sensors, for monitoring the performance of the system. The pressure in a duct is typically monitored by a pressure sensing unit comprising a housing that is attachable to the exterior surface of a wall of the duct and includes a duct wall penetrating tube to communicate the fluid pressure from a point distal of the inside surface of the duct wall to a differential pressure transducer located in the housing. A differential pressure transducer typically comprises a transducer element, such as a diaphragm or a strain gauge, that is arranged to respond to a difference between the pressure applied at one input to the transducer element and the pressure applied at a second input and a measuring system to output a signal indicative of the pressure differential. For example, Crider, U.S. Pat. No. 6,122,972, discloses a pressure sensor comprising a dielectric material interposed between a first conductive surface and a dissimilarly shaped, second conductive surface that is isolated from the first conductive surface. The dielectric material is movable with respect to at least one of the conductive surfaces in response to a pressure difference at the inlet ports. A measurement system connected to at least one of the conductive surfaces measures the change in capacitance between the conductive surfaces as a result of movement of the dielectric material in response to a change in differential pressure. Duct mounted sensors may be arranged to sense the gauge pressure or the absolute pressure of the fluid in the duct or the pressure differential between the ends of a section of a duct.

Combining a plurality of sensors in a single enclosure can reduce the cost the sensing units required for a fluid circulating system, such as a ventilation system for a building. Moreover, if a plurality of sensors can be installed at a single insertion point in a duct, the cost of installing and maintaining the ventilation system and the likelihood of leakage can be reduced.

What is desired, therefore, is a sensing unit enabling installation of a plurality of sensors, including a pressure sensor, at single insertion point in a fluid circulation duct.

DETAILED DESCRIPTION OF PREFERRED EMBODIMENTS

Figure 1A:
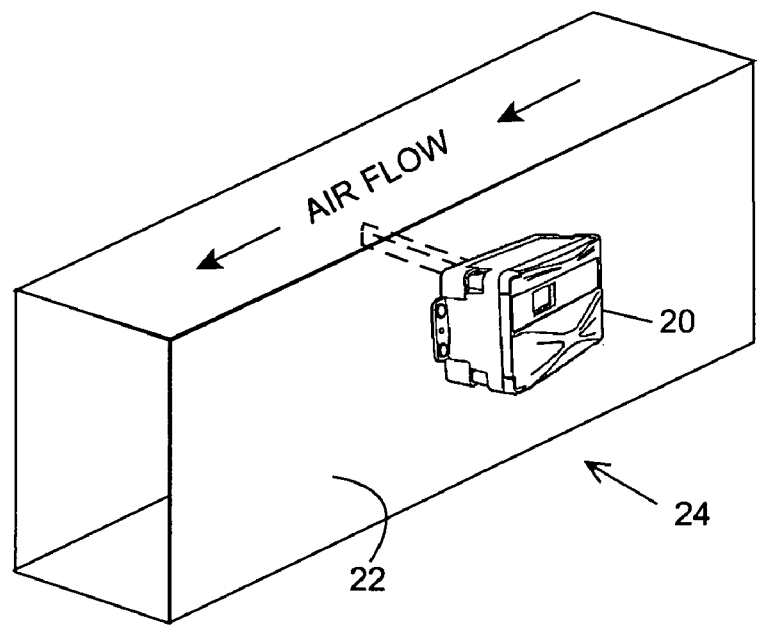
FIG. 1A is a perspective view of a portion of a duct and a duct mounted sensing unit arranged to sense a pressure of a fluid in the duct.

Building codes commonly specify ventilation requirements for indoor spaces on a per-person basis. In the past, sufficient ventilation was provided at all times to satisfy the per person requirements of a fully occupied space. However, building occupancy commonly varies throughout a day and often varies from day-to-day and considerable energy is required to heat, cool, humidify and move the replacement air. Providing full occupancy ventilation, even on a periodically varying basis, can be very energy inefficient and expensive. Demand controlled ventilation seeks to optimize occupant comfort and well being and energy consumption under conditions of variable and intermittent occupancy by varying the amount of outside air added to a space. Since carbon dioxide ($CO_2$) is a product of human respiration and its presence in an indoor space is often relatable to the presence of other pollutants that effect human performance, $CO_2$ concentration is commonly used by demand-controlled ventilation systems as an indicator of the occupancy in establishing the amount of outside air that is required to satisfy the per-person ventilation requirements of building codes.

In addition to supplying outside air to interior spaces, the air handling system typically heats, cools and modifies the humidity of the air circulating in a structure. Since comfort is a function of humidity as well as temperature, air handling systems commonly include sensors for both temperature and humidity.

In some applications, the $CO_2$ concentration, the humidity and the temperature are sensed with one or more sensing units mounted on the wall of the individual space(s) to be monitored. However, the sensors are not inexpensive and, since wall mounted sensing units are only exposed to the local conditions, at least one sensor for each parameter must be installed in each space to be monitored. In some applications, particularly where several spaces have the same or similar occupancy, or where the space is periodically remodeled and walls are moved, the cost of the ventilation system can be reduced by locating a sensing unit in the duct that carries the return air from the space(s).

In addition to sensing parameters related to air quality, ventilation and other fluid circulating systems commonly include pressure sensors to measure the pressure in the duct for purposes of monitoring performance of the system. For examples, an excessive pressure in a duct may indicate impending duct failure and an insufficient pressure may indicate failure of a fan drive or an unexpected closure of a damper. In addition, the differential pressure between two points in the duct, in conjunction with knowledge of the duct's configuration, may be used to monitor fluid flow in the duct. For example, an excessive difference in pressure upstream and downstream of an in-duct filter may indicate that the filter is plugged and should be cleaned or replaced.

The present inventors realized that combining sensors for each of a plurality of fluid parameters, such as temperature, humidity, pressure and carbon dioxide concentration, in a single sensing unit that could be installed at a single insertion point in a duct would substantially reduce the cost of installing and maintaining sensors for a fluid handling system.

Figure 1B:
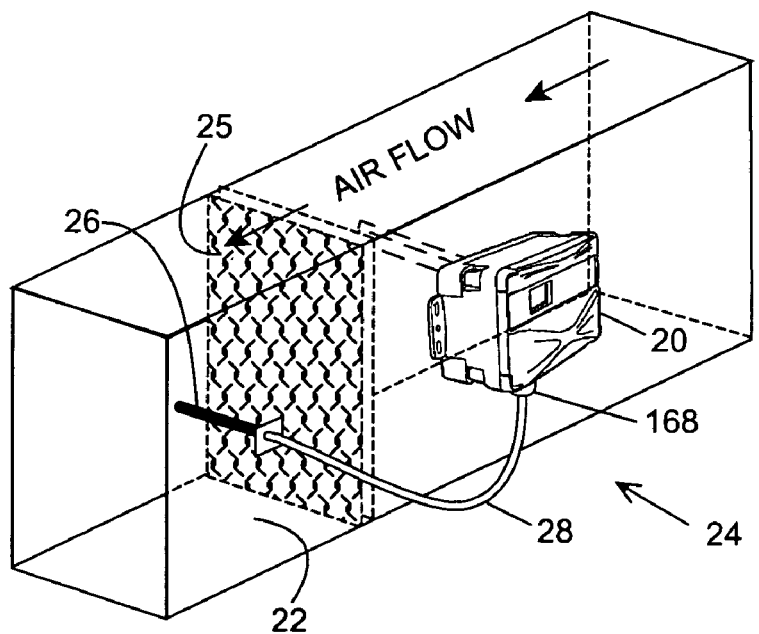
FIG. 1B is a perspective view of a portion of a duct and a duct mounted sensing unit arranged to sense a pressure differential between two points in a duct.

Referring in detail to the drawings where similar parts are identified by like reference numerals, and, more particularly to FIGS. 1A and 1B, the sensing unit 20 is mountable on the exterior surface of a wall 22 of a duct 24 to enable sensing of the pressure and at least one other characteristic of the fluid in the duct, for example, temperature, humidity, $CO_2$ concentration, carbon monoxide (CO) concentration, volatile organic compounds (VOC) or smoke. The construction of the sensing unit enables the installation of multiple sensors at a single insertion point in the duct reducing the cost of sensor installation and eliminating potential leakage points. As illustrated in FIG. 1A, the sensing unit may be installed to measure the pressure and other characteristic(s) of the fluid at single point in the duct, the insertion point for the sensing unit. On the other hand, as illustrated in FIG. 1B, by inserting a second inlet 26 for the pressure sensor into the fluid in the duct at a point remote from the insertion point for the sensing unit, the sensing unit can be used to sense the pressure differential between two points in the duct. For example, the difference in the pressures on opposite sides of the filter 25 may be used to trigger an alarm or other indicator when the filter has become plugged and should be cleaned or replaced.

Figure 2:
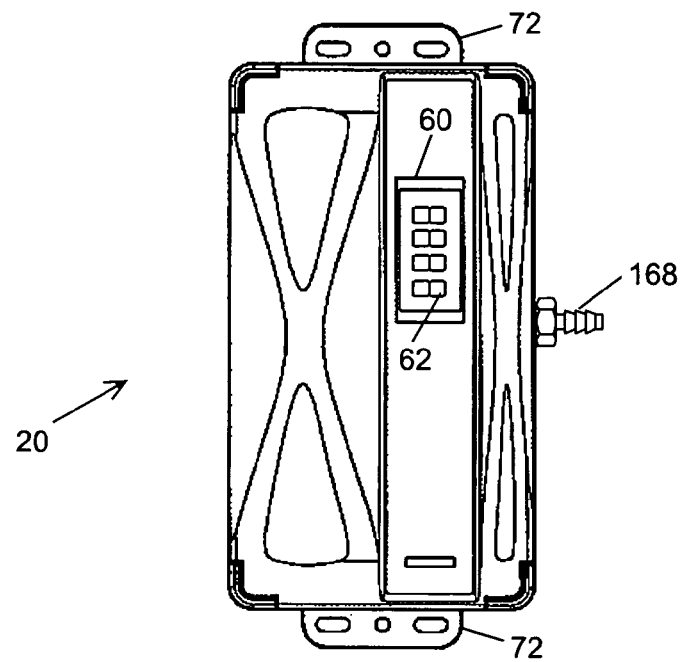
FIG. 2 is a top view of a duct-mountable sensing unit.
Figure 3:
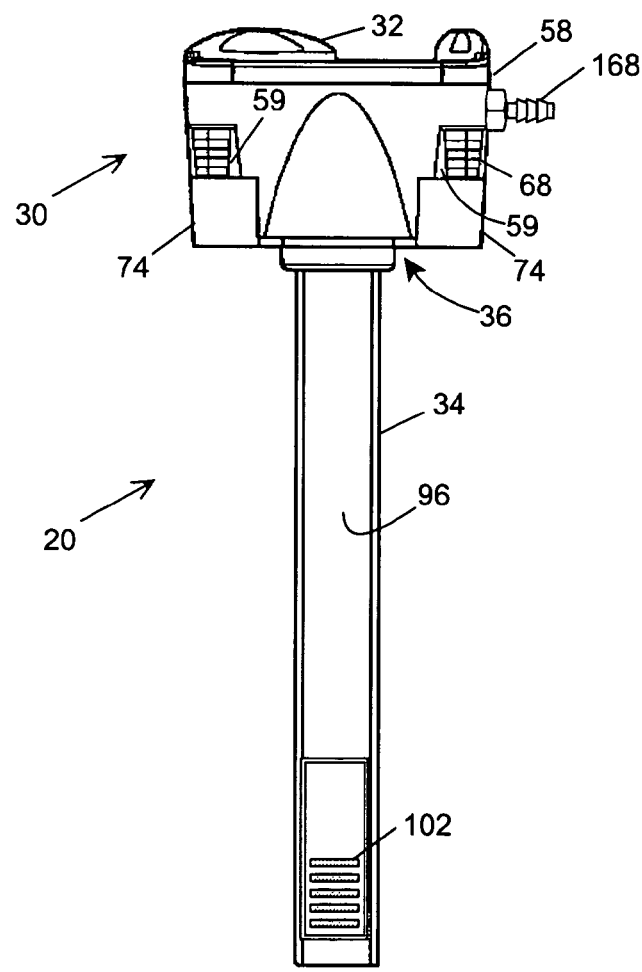
FIG. 3 is an elevation view of the duct-mountable sensing unit of FIG. 2.

Referring also to FIGS. 2 and 3, the enclosure for the sensing unit 20 comprises, generally, a housing 30, a cover 32, a sensor beam 34 and a mounting plate 36. While a number of materials would be suitable for use in construction of the enclosure, the major parts of the enclosure preferably comprise and an insulating plastic, such as acrylonitrile butadiene styrene (ABS).

Figure 4:
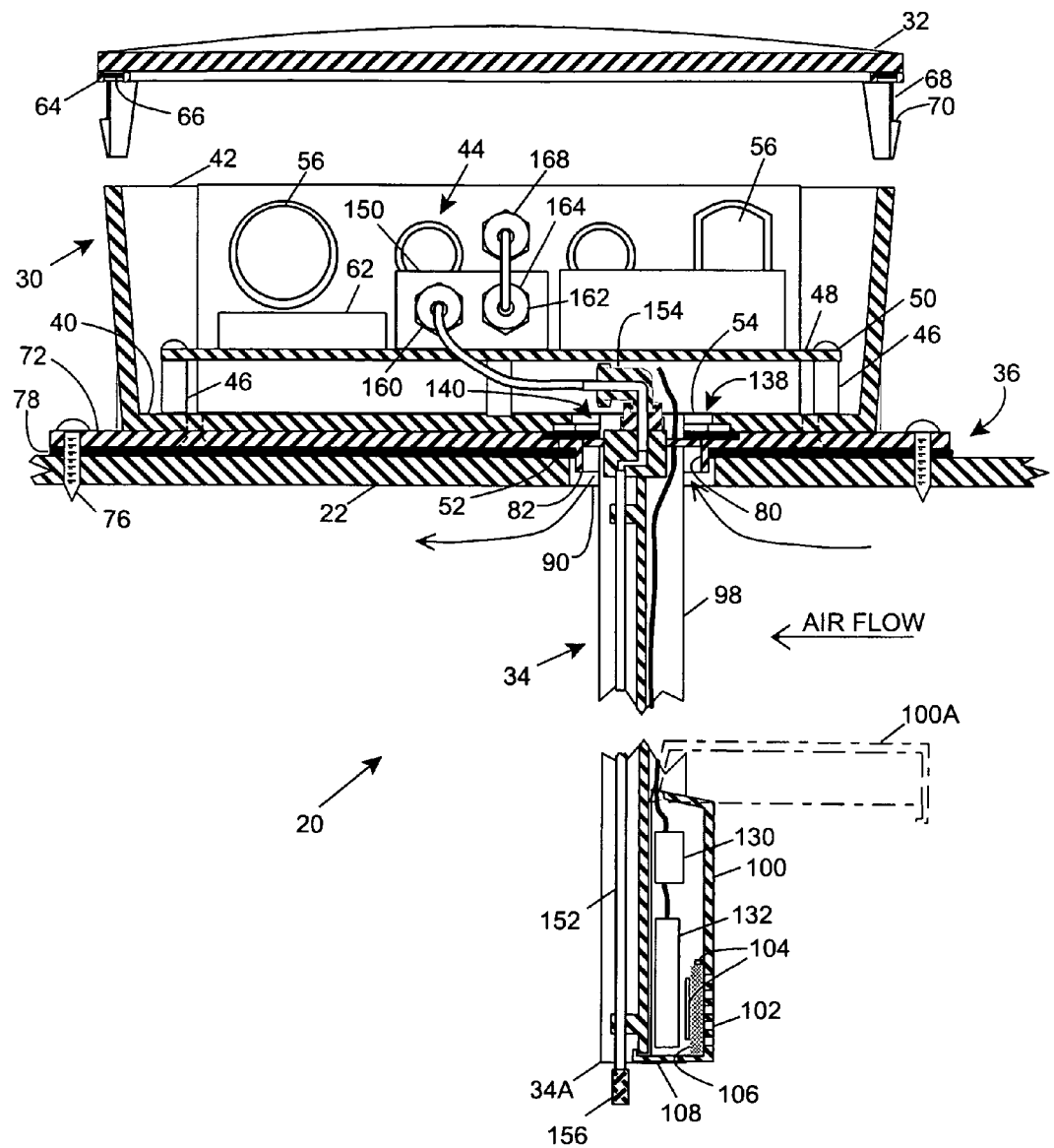
FIG. 4 is a section view of the duct mountable sensing unit along line 4-4 in FIG. 2.

Referring also to FIG. 4, the housing 30 comprises, generally, an open box having a generally rectangular base 40 with chamfered corners and a projecting wall 42 that encircles the perimeter of the base and defines an opening 44 that extends from the base to the exposed edge of the wall that is distal the base. A plurality of standoffs 46 are molded on the interior surface of the base to support a circuit board 48 and enable the circuit board to be secured to the base with screws 50. The base defines a stepped aperture having a first, larger diameter aperture 52 that extends from the outside of the housing partially through the thickness of the base and a second smaller aperture 54 that extends coaxial with the first aperture through the remaining portion of the thickness of the base. The wall of the housing includes a plurality of portions defined by locally thin, inscribed wall sections or knockouts 56 enabling a user to create one or more apertures of predefined size and shape for connecting conduit or electrical connectors to the housing by striking an inscribed portion of the wall to separate the knockout from the wall. In addition, a wall portion 58 proximate the exposed edge extends beyond the chamfered corner 59 of the wall to form a pocket between the extended portion of the wall and the chamfered wall portion.

The cover 32 is generally rectangular in shape and includes a window 60 through which a user can observe a display 62 mounted on a circuit board that is secured in the housing. The cover includes a groove portion 64 on the surface that will engage the exposed edge of the wall when the cover is installed on the base. The groove retains an elastomer seal 66 that is arranged to contact the exposed edge of the wall when the cover is in place on the housing to seal to the joint between the wall and the cover. A tapered stake portion 68 projects from the cover at each corner. The stake portions are arranged to slide into the pockets at the corners of the housing and include a surface 70 that will engage a corresponding surface of the pocket when the cover is in place securing the cover to the housing.

The mounting plate 36 is securable to the outside surface of the base of the housing by screws which engage the base. The mounting plate is generally rectangular and includes a mounting ear portion 72 that projects from each end of the mounting plate to permit the mounting plate and the remainder of the attached enclosure to be secured to the wall 22 of a duct with screws 76. A gasket 78 interposed between the duct wall and the mounting plate seals the interface to prevent leakage. The mounting plate includes a projection 74 at each corner that is arranged to engage the outside of the wall of housing at the corner chamfers 59 to aid in aligning the mounting plate with the housing. The mounting plate also includes a portion defining an aperture 80 that is coaxial with the aperture in the base of the housing. The aperture extends through a rim 82 that projects from the surface of the mounting plate that is proximate the duct wall to form an elongated cylindrical aperture. The coaxial apertures of the housing and the mounting plate form an enclosure aperture providing a passage for fluid communication between the duct and the enclosed interior volume of the housing.

Figure 5:
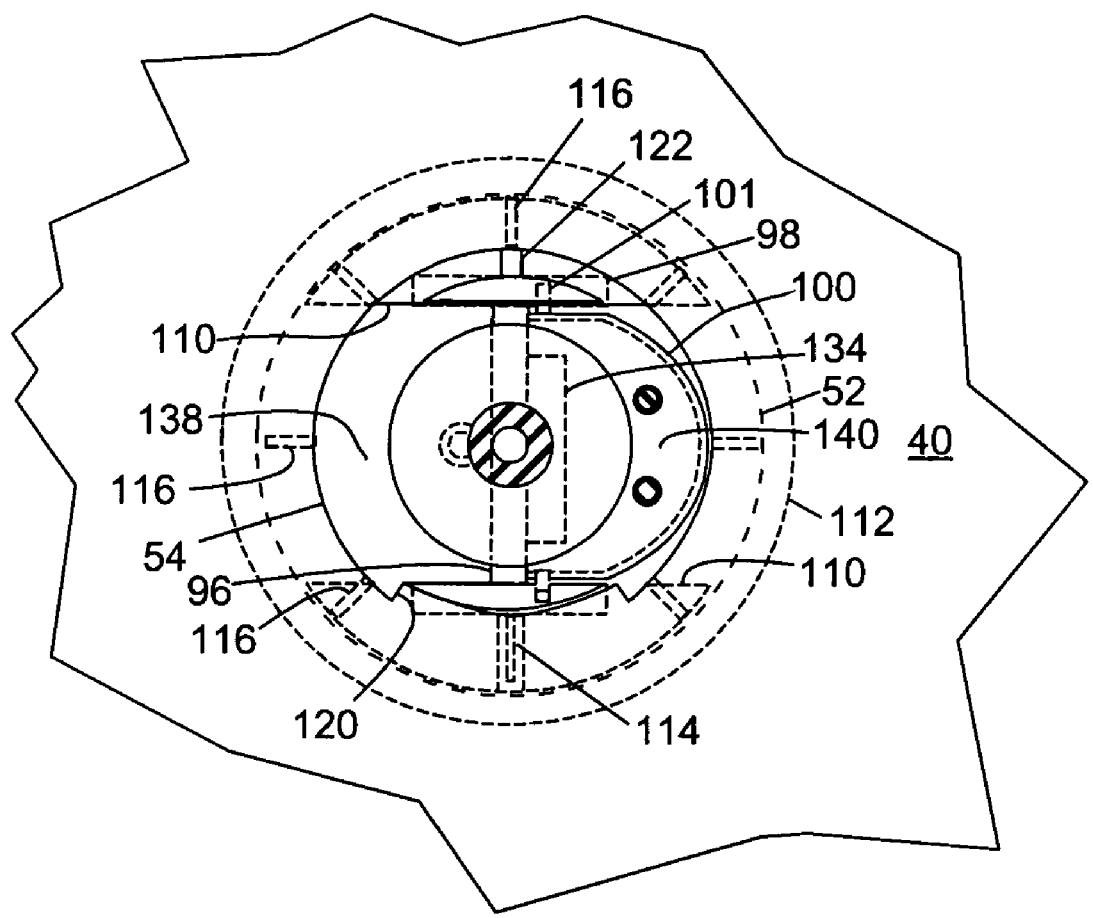
FIG. 5 is a top view of a portion of the base of a sensing unit housing and a sensor beam of a duct mountable sensing unit.

A rotatable sensor beam 34 is secured to the housing and projects from the surface of the mounting plate that interfaces with the wall of the duct. When the enclosure is installed on the wall of a duct, an aperture 90 is formed in the wall and the sensor beam is inserted through the aperture. The sensors for certain fluid parameters, for example humidity and temperature, are affixed proximate the projecting end 34A of the sensor beam so that when the enclosure is installed on the duct wall the sensors are supported in the fluid stream away from the boundary layer adjacent to the interior of the duct's wall. Referring also FIG. 5, the cross-section of the sensor beam is generally that of an I-beam comprising an elongate central web 96 with an elongate flange 98 affixed transverse to the web on each edge of the web.

A sensor housing 100 is attached to the end 34A of the sensor beam distal of the housing to enclose one or more sensors secured to the sensor beam. The sensor housing comprises, substantially, a wall forming an elongate, hollow cylinder half with enclosed ends. The sensor housing includes a plurality of grill slots 102 enabling fluid in the duct to be communicated with the enclosed sensors while preventing large particles in the fluid stream from entering the sensor housing. A plurality of projecting surfaces 104 on the inner surface of the sensor housing provides securement for a screen 106 that protects the interior of the sensor housing from particles that are small enough to pass through the grill slots. To facilitate cleaning of the screen and maintenance of the enclosed sensors, the sensor housing is hingedly attached to the sensor beam flanges by projecting hinge pins 101 that engage apertures in the flanges of the sensor beam. The end of the sensor housing distal of the hinge pins is secured to the web of the sensor beam by an flexible latch beam 108 that can be elastically deformed to disengage from the sensor beam permitting the housing to be opened allowing access to the sensors and the screen for cleaning or otherwise. The hinged connection retains the sensor housing to the sensor beam even when the housing is open 100A to avoid misplacing the sensor housing during maintenance.

The sensor beam is rotatably secured to the housing of the sensing unit enabling the rotation of the sensor beam so that the web of the beam and the sensor housing can be aligned substantially normal to the flow of fluid in the duct without regard to the orientation of the housing on the exterior wall of the duct. The sensor beam passes through the aperture in the mounting plate until enlarged flange sectors 110, arranged transverse to the longitudinal axis of the sensor beam and projecting outward from the flanges of the beam, engage an elastic washer 112 on the surface of the mounting plate. When the mounting plate is engaged with the base of the housing and secured with screws, the flange sectors on the sensor beam are trapped between the base of the housing and the elastic washer interposed between the flange sectors and the mounting plate. The washer seals the interface between the base of the housing and the mounting plate and provides axial resiliency in the sensor beam mounting. A ridge 114 projecting from the upper surface of a flange sector engages the ones of a plurality of grooves 116 on the stepped surface of the aperture in the base of the housing. Engagement of the ridge and a groove under the resilient urging of the elastic washer provides a detent to maintain the rotational position of the sensor beam. A limiting sector 120, projecting radially into the aperture 54 in the base of the housing engages a stop lug 122 on the sensor beam to limit rotation of the sensor beam to less than one revolution to avoid twisting the wires that connect the sensor elements in the sensor housing with the circuit board in the sensing unit housing 30. The cylindrical inner surface of the rim 82 is arranged to engage a bearing surface sector formed on each of the outer surfaces of the sensor beam flanges to aid in supporting the sensor beam against lateral force created by the flowing fluid impinging on the web of the sensor beam.

One or more sensors 130, 132, such as a humidity sensitive capacitor, as disclosed by Cota, U.S. Pat. No. 5,844,138, and a temperature sensor, such as a thermistor or an RTD element, can be secured to the sensor beam in the sensor housing and connected to the circuit board in the sensing unit housing 30 by wires that pass through a wiring clearance slot 134 in the end of the sensor housing and extend along the web of the sensor beam. Other sensors 136, such as a non-dispersive, infrared carbon dioxide sensor can be attached to the circuit board or otherwise secured in the internal volume of the sensing unit housing 30. The I-beam cross-section of the sensor beam in conjunction with the substantially round apertures in the housing and the mounting plate forms two passages 138, 140 through which fluid in the duct is communicated with the interior of the sensing unit housing and any sensors mounted therein. When the sensor beam is rotated so that the web is transverse to the flow of fluid, a high pressure area is created on the upstream side of the flange and a low pressure area is created on the downstream side and the pressure differential between the two fluid passages 138, 140 causes fluid in the duct to flow into and out of the housing and into contact with the sensors enclosed in the housing.

Figure 6:
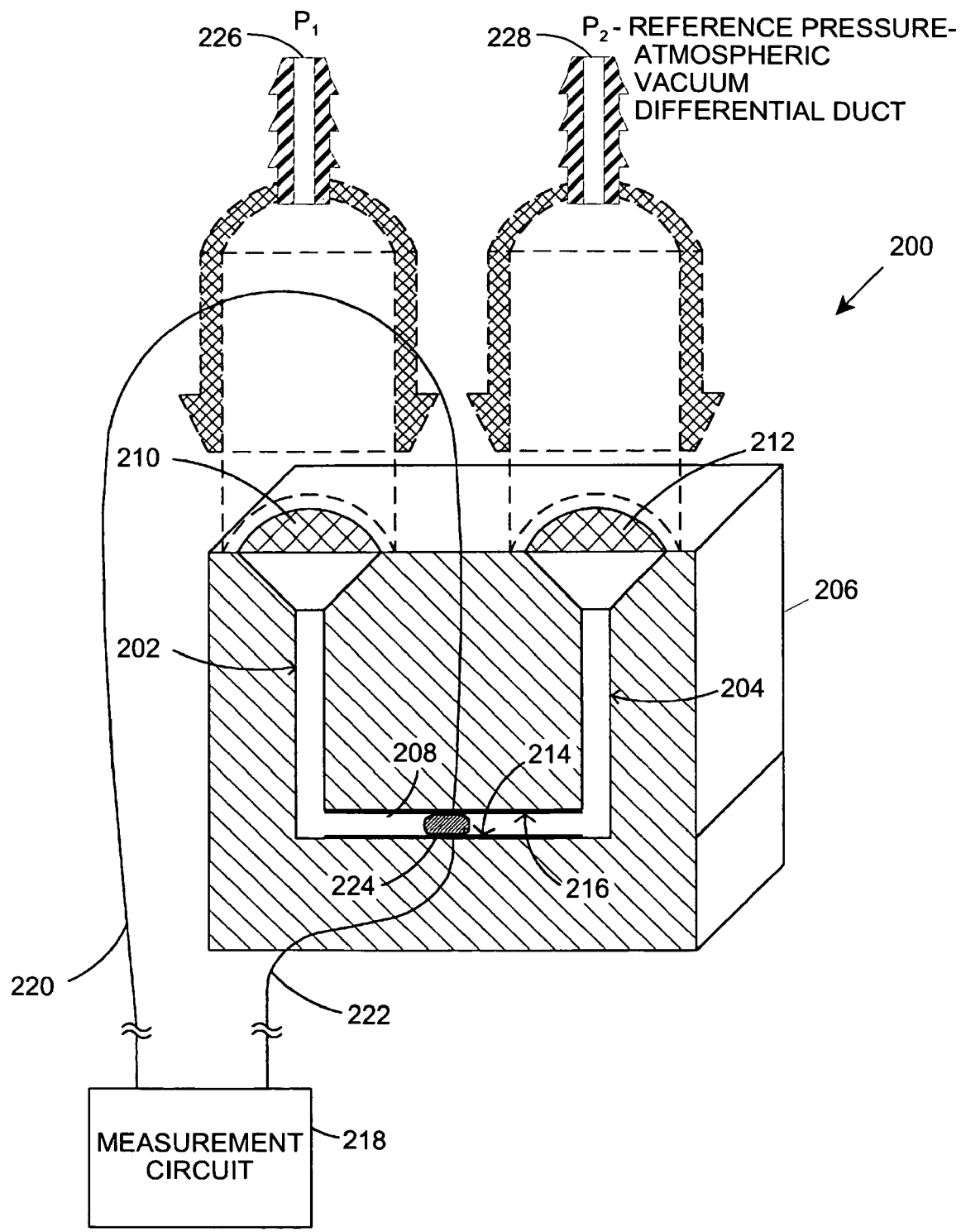
FIG. 6 is a schematic illustration of a pressure sensor.

The sensing unit also includes a pressure sensor 150 secured to the circuit board or otherwise in the internal volume of the housing 30. The pressure sensor typically comprises a detector that is sensitive to a pressure differential, such as a flexible diaphragm or a piezoelectric element, and measuring mechanism, for example a strain gauge, variable capacitor, or potentiometer, to detect the changes in the pressure sensitive element in response to changes in differential pressure. For example, Crider, U.S. Pat. No. 6,122,972, discloses a pressure sensor comprising a capacitor having a capacitance responsive to a change in differential pressure between two ports. Referring to FIG. 6, the pressure sensor 200, includes pair of vertical channels 202 and 204, and an interconnecting horizontal channel 208 in an electrically non-conductive body 206. The vertical channels are sealed by respective diaphragms 210 and 212, although, one of the diaphragms may be omitted. A pair of dissimilarly shaped, conductive upper and lower surfaces 214 and 216 in the horizontal channel are electrically isolated from each other and electrically interconnected to a measurement circuit 218 by wires 220 and 222. A small volume of a fluid 224, preferably having a relatively high dielectric constant, is located within the horizontal channel between the conductive surfaces.

A first pressure ($P_1$) is applied at a first inlet port 226 and a second pressure ($P_2$), a reference pressure for the first pressure, is applied at a second inlet port 228. Pressure applied at the first inlet port urges the corresponding diaphragm to deflect and displace the fluid in the vertical and horizontal channels toward the second port while pressure at the second inlet port is urging the second diaphragm to deflect and displace the fluid toward the first port. The dielectric fluid 224 in the horizontal channel will be displaced toward the inlet port exposed to the lesser pressure changing the capacitance of the two dissimilarly shaped conductive surfaces 214 and 216 in the horizontal channel. The measurement circuit senses a change in capacitance indicating a change in the pressure differential between the two inlet ports.

Typically pressure sensors are arranged to sense gauge pressure, absolute pressure or the pressure differential between the inlet ports. If, for example, the first inlet port 226 is fluid communication with the fluid in the duct and the second inlet port is vented to the atmosphere, the differential pressure between the inlet ports is referenced to atmospheric pressure or gauge. If, however, the second port is connected to an evacuated enclosure, the differential pressure between the inlet ports is the absolute pressure of the fluid in the duct. On the other hand, if the second inlet is in fluid communication with the fluid in the duct at a point remote from the insertion point of the sensing unit, the output of the pressure sensor will be the difference in the pressure of the fluid in the duct between the two inlets. Knowledge of the differential pressure, the temperature and the size and shape of the duct permits calculation of the amount of fluid flowing in the duct.

In the sensing unit 20, one of the inlet ports 160 of the pressure sensor 150 is in communication with the fluid in the duct through a tube 152 that terminates inside the duct proximate the distal end 34A of the sensor beam 34. A swivel fitting 154 attached to the web of the sensor beam permits rotation of the sensor beam to align the sensors in the sensor housing transverse to the direction of fluid flow in the duct. Pressure sensors are commonly sensitive to horizontal alignment and the ability to rotate the sensor beam enables the sensors on the sensor beam to be arranged transverse to the fluid flow in the duct while maintaining the correct horizontal alignment of the pressure sensor in the housing. A filter or screen 156 protects the pressure sensor inlet from debris in the fluid flowing in the duct.

The second port 162 of the pressure sensor is connected by a tube 164 to a bulkhead fitting 168 that terminates outside of the housing. The bulkhead fitting comprises the second port of the pressure sensor. If the inlet for the second port 162 terminates in the atmosphere, for example, the bulkhead fitting 168 is the terminus of the second port as illustrated in FIG. 1A, the pressure sensor will be arranged to sense gauge pressure, the difference between the pressure of the fluid in the duct and atmospheric pressure. On the other hand, if the second inlet is connected to an evacuated, the sensor will be arranged to sense the absolute pressure of the fluid in the duct. To sense pressure differential in a section of the duct, the bulkhead fitting 168 is connected so that it communicates with the fluid in the duct at a point remote from the entry point 90 for the sensor beam. As illustrated in FIG. 1B, a tube 28 connecting the bulkhead fitting to a duct probe tube 26 that is inserted through the wall of the duct to project into the duct enables fluid communication with fluid in the duct at a point remote of the sensing unit insertion point and sensing of the pressure differential between the two inlets to the pressure sensor.

On the other hand, terminating the first inlet of the pressure sensor in the housing, for example, by disconnecting the tube 152 from the inlet port 160, permits sensing of the difference between the housing pressure and the reference pressure at the second inlet. While the pressure in the housing may be different from the pressure proximate the center of the duct, the interior volume of the housing is in fluid communication with the interior of the duct and the pressure in the housing is related to the pressure in the duct. If accurate measurement of the magnitude of the pressure in the duct is not required, for example when monitoring operation of a fan drive, terminating the first inlet in the housing may be sufficiently accurate for some purposes.

The sensing unit with the pre-installed sensors is installed on the exterior wall of a duct by making a hole in the wall of the duct of sufficient size to accept the sensor beam probe and the rim on the mounting plate. The sensor beam is rotated so that the web of the beam is transverse to the flow of fluid in the duct and inserted into the hole in the duct wall. The mounting plate with the gasket interposed between the mounting plate and the duct wall is secured to the exterior of the duct wall by screws. An electrical connection is made to the circuit board in the enclosure and installation is complete.

The sensing unit enables at least three environmental sensors, to sense parameters of a fluid in a duct, to be installed through a single aperture in the duct wall substantially reducing the installation time and leakage possibilities for a ventilation system.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A sensing unit to sense a plurality of parameters of a fluid in an interior of a duct defined by a duct wall having an exterior surface and including a portion defining a duct aperture, said sensing unit comprising:
    (a) an enclosure including:
        (i) a first enclosure portion including a mounting surface and arranged for attachment to said exterior surface of said duct wall with said mounting surface abutting said duct wall; and
        (ii) a second enclosure portion rotatably attached to said first enclosure portion and arranged to extend through said duct aperture when said mounting surface abuts said duct wall, said enclosure arranged such that attachment of said first enclosure portion to said duct wall secures a rotational position of said second enclosure portion relative to said first enclosure portion;
    (b) a pressure sensor supported by said enclosure and responsive to a pressure at a first inlet and a pressure at a second inlet remote from said first inlet; and
    (c) another sensor supported in said fluid by said enclosure.

2. The sensing unit of claim 1 wherein said pressure at said second inlet comprises an atmospheric pressure.

3. The sensing unit of claim 1 wherein said pressure at said second inlet comprises a pressure of said fluid in said duct at a location remote from said duct aperture.

4. The sensing unit of claim 1 wherein said pressure at said second inlet comprises a pressure less than an atmospheric pressure.

5. The sensing unit of claim 1 wherein said other sensor is supported in said interior of said duct by said second portion of said enclosure.

6. The sensing unit of claim 1 wherein said other sensor is supported in an interior volume of said enclosure, said interior volume in fluid communication with said interior of said duct through said duct aperture.

7. The sensing unit of claim 1 wherein said other sensor is responsive to carbon dioxide in said fluid.

8. The sensing unit of claim 1 wherein said other sensor is responsive to a humidity of said fluid in said duct.

9. The sensing unit of claim 1 wherein said other sensor is responsive to a temperature of said fluid in said duct.

10. A sensing unit to sense a plurality of parameters of a fluid in an interior of a duct defined by a duct wall having an exterior surface and including a portion defining a duct aperture, said sensing unit comprising:
    (a) an enclosure attachable to said exterior surface of said duct wall and including a portion extending through said duct aperture;
    (b) a pressure sensor supported by said enclosure and responsive to a pressure at a first inlet and a pressure at a second inlet remote from said first inlet;
    (c) another sensor supported in said fluid by said enclosure; and
    (d) a sensor housing hingedly attached to said portion of said enclosure extending through said duct aperture.

11. The sensing unit of claim 10 wherein said sensor housing includes a portion defining a grill aperture enabling communication of fluid in said duct with an interior of said sensor housing.

12. The sensing unit of claim 11 further comprising a screen having a portion defining an opening smaller than said grill aperture, said screen detachably engageable with a surface of said interior of said sensor housing.

13. A sensing unit to sense a plurality of parameters of a fluid in an interior of a duct defined by a duct wall having an exterior surface and including a portion defining a duct aperture, said sensing unit comprising:
    (a) an enclosure including:
        (i) a first enclosure portion including a mounting surface and arranged for attachment to said exterior surface of said duct wall with said mounting surface abutting said duct wall; and
        (ii) a second enclosure portion rotatably attached to said first enclosure portion and arranged to extend through said duct aperture when said mounting surface abuts said duct wall, said enclosure arranged such that attachment of said first enclosure portion to said duct wall secures a relative rotational position of said second enclosure portion and said first enclosure portion;
    (b) a pressure sensor supported by said enclosure and responsive to a pressure at a first inlet supported in said fluid in said interior of said duct and remote from said duct wall by said second enclosure portion and a pressure at a second inlet remote from said first inlet;
    (c) a second sensor supported in said fluid in said interior of said duct and remote from said duct wall by said second enclosure portion; and
    (d) a third sensor supported in an interior volume of said first enclosure portion, said interior volume in fluid communication with said interior of said duct through said duct aperture.

14. The sensing unit of claim 13 wherein said second inlet comprises a conduit connecting said pressure sensor to an atmospheric fluid outside of said enclosure and said duct.

15. The sensing unit of claim 13 wherein said second inlet comprises a conduit connecting said pressure sensor to said fluid in said duct at a location remote from said duct aperture.

16. A sensing unit to sense a plurality of parameters of a fluid in an interior of a duct defined by a duct wall having an exterior surface and including a portion defining a duct aperture, said sensing unit comprising:
(a) an enclosure attachable to said exterior surface of said duct wall and including a portion extending through said duct aperture and further comprising a sensor housing hingedly attached to said portion of said enclosure extending through said duct aperture;
(b) a pressure sensor supported in said enclosure and responsive to a pressure at a first inlet supported in said fluid in said interior of said duct by said portion of said enclosure extending through said duct aperture and a pressure at a second inlet remote from said first inlet;
(c) a second sensor supported in said interior of said duct by said portion of said enclosure extending through said duct aperture, said second sensor located in said sensor housing; and
(d) a third sensor supported in an interior volume of said enclosure, said interior volume in fluid communication with said interior of said duct through duct aperture.

17. The sensing unit of claim 16 wherein said sensor housing includes a portion defining a grill aperture enabling communication of fluid in said duct with an interior of said sensor housing.

18. The sensing unit of claim 17 further comprising a screen having a portion defining an opening smaller than said grill aperture, said screen detachably engageable with a surface of said interior of said sensor housing.

* * * * *

UNITED STATES PATENT AND TRADEMARK OFFICE
CERTIFICATE OF CORRECTION

| | | |
|---|---|---|
| PATENT NO. | : 8,024,982 B2 | Page 1 of 1 |
| APPLICATION NO. | : 12/218681 | |
| DATED | : September 27, 2011 | |
| INVENTOR(S) | : Casey Pettit et al. | |

It is certified that error appears in the above-identified patent and that said Letters Patent is hereby corrected as shown below:

Title Page, Item (75) Inventors:

Change "Mathew Vernon" to read --Matthew Vernon--.

Signed and Sealed this
Twenty-seventh Day of March, 2012

David J. Kappos
*Director of the United States Patent and Trademark Office*